Figure 1:
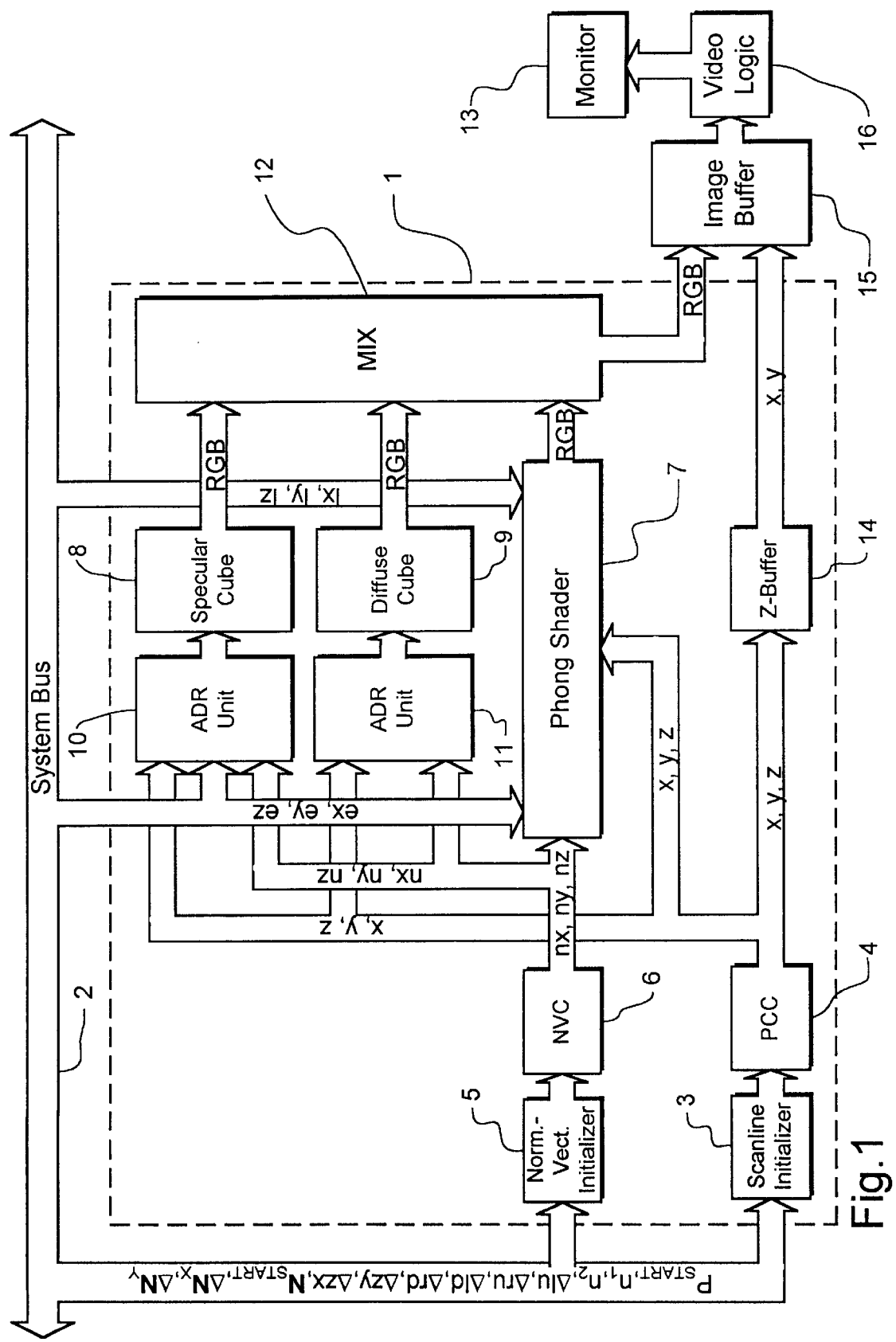

United States Patent [19]
Wittig et al.

[11] Patent Number: 6,078,333
[45] Date of Patent: Jun. 20, 2000

[54] IMAGES AND APPARATUS FOR CARRYING OUT THE METHOD

[75] Inventors: Oliver Wittig; Suwanto Budianto, both of Berlin, Germany

[73] Assignee: GMD - Forschungszentrum Informationstechnik GmbH, Germany

[21] Appl. No.: 09/026,694

[22] Filed: Feb. 20, 1998

[30] Foreign Application Priority Data

Feb. 21, 1997 [DE] Germany ........................... 197 08 679

[51] Int. Cl.⁷ ................................................... G06T 5/00
[52] U.S. Cl. ........................ 345/426; 345/505; 345/506; 345/425; 345/426; 345/430
[58] Field of Search .................................. 345/502, 505, 345/506, 425, 430, 426

[56] References Cited

U.S. PATENT DOCUMENTS 5,563,989  10/1996  Billyard ................................. 345/426
5,923,334   7/1999  Luken ..................................... 345/423

OTHER PUBLICATIONS

B.T. Phong: "Illumination for Computer Generated Pictures". In: Communications of the ACM, Jun. 1975, vol. 18, No. 6, pp. 311–317.

D. Jackel: "A Real Time Rendering System with Normal Vector Shading". In: Ninth Eurographics Workshop on Graphics Hardware, Sep. 1994, Oslo, pp. 48–57.

D. Voorhies et al: "Reflection Vector Shading Hardware" In: Computer Graphics Proceedings, Annual Conference Series, 1994, pp. 163–166.

*Primary Examiner*—Mark R. Powell
*Assistant Examiner*—Motilewa Good-Johnson
*Attorney, Agent, or Firm*—Venable; George H. Spencer; Robert Kinberg

[57] ABSTRACT

In an image-processing method and apparatus for displaying computer-modeled objects that are present in the form of a grid model and are simulated by a plurality of adjacent polygon surfaces, the individual polygon surfaces are divided into pixels and the image impression of each pixel is calculated, on the one hand, corresponding to Phong's illumination model and, on the other hand, by suitable addressing of storage matrices (8, 9) that represent the image impression of the environment, so both a natural-looking shading and the consideration of reflections of the environment in the objects are possible; the environment reflections can be modulated from perfect mirroring of the environment to a complete lack of mirroring.

15 Claims, 4 Drawing Sheets

IMAGES AND APPARATUS FOR CARRYING OUT THE METHOD

DESCRIPTION

The invention relates to an imaging method for displaying computer-modeled objects, as defined in the preamble to claim 1, as well as an apparatus for executing the method, as defined in the preamble to claim 9.

In computer-graphics systems, objects are usually simulated with grid models, in which the objects are defined by the spatial coordinates of the node points of the grid model and the optical properties, such as the color and reflection behavior of the polygon surfaces between the node points. Computer-graphics systems of this type are known from, for example, VOORHIES, D.; FORAN, J.: Reflection Vector Shading Hardware, SIGGRAPH '94, and JACKEL, D.; Rüsseler, H.: A Real Time Rendering System with Normal Vector Shading; 9th Eurographics Workshop on Graphics Hardware, Oslo (Norway), 1994. To calculate the image impression, the individual polygon surfaces are divided into pixels, and the position and spatial location of the local surface normal, which are decisive for the reflection behavior and thus the impression of the image, are calculated for each pixel. With an inclination of the local surface normal inside the polygon surface, for example, it is also possible, on the one hand, to simulate curved polygon surfaces, so a smooth and thus visually inconspicuous transition can be attained at the edges between adjacent polygon surfaces. On the other hand, it is also possible to simulate rough textures in this manner by inclining the local surface normal inside the respective polygon surface to correspond to the desired texture, which is also referred to as bump-mapping. After the spatial coordinates of the individual pixels and the respective local surface normal have been calculated, the image impression is calculated individually for each pixel, corresponding to a local illumination model; the perspective of the viewer, the spatial position and the optical properties of the pixel, the orientation of the local surface normal and the spatial position and optical properties of the light sources that illuminate the objects are all considered.

Typically, the illumination model used to calculate the image impression of the individual pixels is the one described in PHONG: Illumination for Computer Generated Pictures; Communications of the ACM, 18(6): 311–317, June 1975, which has also been incorporated into the quasi-industry standard OpenGL. This illumination model advantageously permits the consideration of numerous optical effects, such as ambient, diffuse and specular reflection, and thus produces a very realistic image impression.

A disadvantage of the known imaging methods of the above-described types is that the image impression of a pixel is essentially only dependent on the spatial position of the pixel relative to the individual light sources, and the optical properties of the pixel and the light sources. However, interactions between the individual pixels or objects of a spatial scene are only taken into account in that mutual shadings are determined and the shaded pixels are suppressed in the representation (hidden surface removal). The images generated with the known imaging methods therefore appear to be artificial because of the extensively isolated calculation of the individual pixels independently of one another.

It is therefore the object of the invention to provide an imaging method for representing computer-modeled objects, in which the individual objects are not considered in isolation, but as components of a spatial scene with corresponding optical interactions for obtaining the most natural possible image impression.

The object is accomplished with an imaging method defined in the preamble to claim 1 and having the characterizing features of this claim, and—with respect to the apparatus for executing the method—by the features of claim 9.

The invention includes the technical teaching of calculating the image impression for each pixel not only corresponding to the local illumination model, but also with consideration of reflections of the environment, by addressing a storage matrix as a function of the spatial position of the local surface normal, and reading out a corresponding image-information value that represents the impression of the environment from a certain perspective.

The term "local illumination model" is not limited here or hereinafter to the aforementioned and preferably used Phong illumination model, but, in principle, also encompasses other illumination models that permit the calculation of the image impression of a pixel of a polygon surface as a function of the illumination relationships and the geometrical relationships.

The measures employed in the invention can be performed with both purely software-based measures and suitable special hardware. The hardware-based solution has the advantage that operations performed simultaneously in parallel assemblies (pipelines) yield significant time advantages.

If "pipelines" are discussed below, they may also involve functional groups, for example in the form of electrical circuits. It may also be that one and the same pipeline or functional group consecutively performs different operations, as is the generally case in processor technology. As explained above, however, speed advantages can be attained if functional groups are active adjacently and in parallel.

Within the scope of the measures of the invention for representing objects within the framework of image processing, the individual polygon surfaces are preferably divided into a plurality of parallel, equidistant scanlines, in which the pixels are in turn disposed equidistantly. The polygon surface is divided by the first pipeline or functional group of a calculation unit, whose input receives a first set of parameters representing the spatial position of the polygon surface, and outputs a plurality of first sets of coordinates at its output, which coordinates respectively represent the spatial position of a pixel. The calculation of the first parameter set for each polygon surface can be effected by a superordinate graphics system that can contain a plurality of the calculation units described here, so it is possible to calculate the image impression of a plurality of objects of a spatial scene in parallel, which drastically reduces the calculation time in complex scenes.

The calculation unit further has a second pipeline that calculates a second set of coordinates for each pixel of the polygon surface, which set represents the spatial position of the local surface normal. It must be pointed out here that the local surface normal need not coincide with the surface normals of the entire polygon surface, because the polygon surface is preferably curved to attain a smooth, visually inconspicuous transition at the edges of adjacent polygon surfaces. In one possible embodiment of this variation, the surface normals at the corner points of the individual polygon surfaces are predetermined by the first parameter set representing the spatial position of the polygon surface. The local surface normal for the individual pixels of the polygon surface is calculated through interpolation of the corner-point normals, which also has the advantage that the local surface normals of adjacent polygon surfaces are identical at the common corner points, and, at most, differ slightly along the common edge because of the interpolation, which results in an essentially smooth and thus visually inconspicuous transition between adjacent polygon surfaces.

Furthermore, a third pipeline is provided that calculates a first image-information value for each pixel corresponding to the local illumination model. On the input side, the third pipeline receives a second parameter set, which represents the spatial position and the optical properties of at least one first light source. Hence, for each light source, the second parameter set preferably includes the spatial coordinates, the vector components of the primary beam direction, the ambient, diffuse and specular color of the light source and, if need be, a so-called spotlight-cutoff angle, which determines the cone angle of the beam cone, outside of which a viewer no longer perceives the light sources. Furthermore, the third pipeline is connected on the input side to the first pipeline for receiving the first coordinate set representing the spatial position of the pixel. The third pipeline is connected on the input side to the second pipeline for receiving the second coordinate set, which represents the orientation of the local surface normal.

Moreover, the calculation unit has a fourth pipeline, which calculates the position of each pixel on a screen as a function of the perspective of the virtual viewer. For this purpose, the fourth pipeline is connected on the input side to the first pipeline, and, from the first coordinate sets representing the spatial position of the individual pixels, respectively calculates a two-dimensional screen data set that represents the horizontal and vertical positions at which the respective pixel must appear inside of the screen coordinate system for generating the desired perspective.

In the calculation of the image impression for the individual pixels, an image-information value is calculated corresponding to the local illumination model; this value represents, for example, the intensity of the three primary colors in a use of the known RGB color model. The term "image-information value" is not limited to the representation of the three primary colors corresponding to the RGB color model, however, but also encompasses the representation of the corresponding parameters in a use of other color models, such as the CMYK color model or the HSB color model. In addition, it is possible to calculate only the gray shading of the respective pixel as an image-information value in a monochromatic representation. The only decisive factor in this case is that the image-information value reflect the image impression of the individual pixel and permit a corresponding actuation of a screen for display.

In accordance with the invention, however, not only the image-information calculated in accordance with the local illumination model is calculated in the determination of the image impression of the individual pixels. Instead, a second image-information value is calculated for the individual pixels that represents the reflection of the environment in the respective pixel. For this purpose, a storage matrix is provided, each of whose storage locations contains a second image-information value that includes the image impression of the environment from a certain perspective. Addressing is effected with an addressing value that is calculated by a first calculation unit as a function of the second coordinate set representing the spatial position of the local surface normal, and/or the third parameter set representing the position of the virtual viewer. The second image-information value is then read out of the storage matrix, which value represents the reflections of the environment and is mixed, by a second calculation unit, with the first image-information value, which was calculated corresponding to the local illumination model, so the user has the opportunity to predetermine weighting factors to determine to which degree the reflections of the environment will be considered. The weighting of the environmental reflections is, however, preferably coupled to the degree of reflection that is predetermined for the respective polygon surface as a material property. Hence, environmental reflections on a dull surface, for example a piece of chalk, can hardly be seen, while a metal-coated surface reflects the environment very well.

The storage matrix preferably simulates a cubic envelope surface (environment cube), in the center point of which the respective pixel is located, with a storage location of the storage matrix being associated with each surface element of the envelope surface; the contents of each location reflects the image impression of the environment in the respective direction. The cubic envelope surface thus represents, to a limited extent, an all-around recording of the environment from the perspective of the individual pixels.

In assuming an ideal mirror reflection at the respective pixel, the viewer perceives the region of the environment that is intersected by the eye vector. From the third parameter set representing the position of the virtual viewer, and the first coordinate set representing the spatial position of the respective pixel, the first calculation unit serving the calculate the addressing value first calculates the eye vector, that is, the connecting line between the viewer and the respective pixel, also called the line of sight. Subsequently, the reflected eye vector is calculated from the eye vector and the second coordinate set representing the spatial position of the local surface normal, and the point of intersection of the reflected eye vector and the cubic envelope surface is determined. The viewer then sees the region of the cubic envelope surface that is intersected by the reflected eye vector. From the reflected eye vector, the second calculation unit calculates the addressing value for the storage location of the storage matrix that contains the image-information value for the associated surface element of the cubic envelope surface.

The invention is not limited to the exclusive consideration of specular reflection at the respective pixel, however. Rather, it is also possible to take into account diffuse reflections of the environment instead of, or in addition to, the specular reflection. In this instance, the storage matrix is addressed as a function of the second coordinate set representing the spatial position of the local surface normal, because the position of the viewer has no bearing on the image impression in diffuse reflection. The environment impression can be preset by the same storage matrix for specular and diffuse reflection, but, to achieve special optical effects, it is also possible to provide different environments for specular and diffuse reflections that are stored in different storage matrices or in different storage regions of the same storage matrix.

In the above-described variations of the invention, the environmental reflections are calculated for diffuse reflection as a function of the local surface normal and for specular reflection as a function of the position of the virtual viewer, on the one hand, and the local surface normal, on the other hand. In a refining variation of the invention, it is further provided that the position of the respective pixel or the entire polygon surface is considered.

To this end, a selection value is determined from the predetermined, first parameter set representing the spatial location of the polygon surface, or the first coordinate set representing the position of the respective pixel, as a function of the position of the pixel or the polygon surface. This selection value then serves in the position-dependent selection of the first or second storage matrix from a plurality of storage matrices that respectively represent different environments. Instead of this, it is also possible to use the selection value to address the first or second storage matrix and select a storage region, as a function of position, within the storage matrix. In this way, it is possible to take into account different environments in the spatial scene, which results in a more natural image impression than in the consideration of a global environment that is unified for all pixels.

As explained above, the storage matrices usually simulate a cubic envelope surface around the respective pixel, and define an all-around recording from the perspective of the respective pixel or polygon surface, with a spatial-angle region of the environment being unambiguously associated with each storage location of the storage matrix. In a contrasting refining variation of the invention, the storage matrices only define a portion—hereinafter referred to as "pattern"—of the environment that repeats on the cubic envelope surface. In the simulation of a cloudy sky as the environment, for example, it is not necessary to define the sky from all possible viewing directions. Instead, it suffices to define one or two clouds in front of a blue background and repeat this pattern on the cubic envelope surface. The storage matrix could then define, for example, one-fourth of one side of the cubic envelope surface, so the predetermined pattern appears a total of 24 times on the cubic envelope surface. This can advantageously increase the optical resolution of the representation of the environment, because a smaller spatial-angle region of the environment is associated with each storage location when the storage matrix remains the same size. If, in contrast, no increased optical resolution of the representation of the environment is desired, the environment can advantageously be represented with a smaller storage matrix. A crucial feature is that the addressing of the storage matrix must be effected differently from the addressing in the above-described variations of the invention, in which the storage matrix respectively defines a complete, all-around recording of the environment. First, the addressing vector is calculated, which corresponds to the local surface normals in diffuse reflection and, in specular reflection, corresponds to the reflected eye vector. The coordinates of the surface element affected by the addressing vector must subsequently be determined. From these coordinates, it is then determined which surface element of the predetermined pattern is present at this location, and which storage location of the storage matrix is to be addressed. In this variation of the invention, therefore, the addressing of the storage matrix necessitates an additional coordinate transformation from the coordinates of the surface element intersected by the addressing vector on the cubic envelope surface into the coordinates inside the predetermined pattern.

In the preferred embodiment of this variation, the predetermined pattern is calculated such that the impact edges of adjacent patterns are not visible on the cubic envelope surface, despite the repetition of the pattern. This presupposes that no jumps in intensity or color occur between adjacent patterns along the impact edges. To avoid the so-called Mach Band effect, it is also advantageous to calculate the pattern such that the change in intensity or color values between adjacent patterns is constant over the impact edge. Because the patterns are often incorporated from existing originals in practice, and therefore do not typically meet the above-described requirements, a corresponding correction can also be made to the intensity or color values following the reading in of the pattern. It is possible, for example, to digitize a pattern that is present in paper form and read it into the storage matrix. The digitized pattern is subsequently processed with an image-processing unit for preventing the above-described optical disturbances at the impact edges. This processing of the read-in pattern is preferably effected by a separate image-processing unit that is connected to the storage matrix and correspondingly adapts the image-information values in the individual storage locations in the area surrounding the impact edges.

In a refining variation of the invention, it is further provided that not only the shading corresponding to the local illumination model and the reflections of the environments in the object surface, but also the surface structure (texture) of the object are taken into account in the calculation of the image impression of the individual pixels. For this purpose, a further storage matrix is provided; each pixel of the individual polygon surface is associated with a storage location of this storage matrix. The storage matrix is addressed by an addressing unit that uses the first parameter set representing the spatial position of the polygon surface and the first coordinate set representing the spatial position of the respective pixel to calculate an address value, which represents the spatial position of the pixel within the polygon surface. An important point is that the address value is not dependent on the spatial position of the polygon surface as a whole, but is determined solely by the position of the pixel within the polygon surface, because the texture would otherwise "migrate" on the object surface if the object were to move. An image-information value that reflects the texture of the polygon surface in the respective pixel is read out of the storage location of the third storage matrix addressed in this manner. The image-information value serving to actuate the screen is then calculated by the second calculation unit as a function of the read-out texture value. The above-described variation of the invention advantageously permits a simulation of a structured surface without necessitating costly modeling and calculation of the surface details.

In the above-described variations of the invention, it is not necessary for the image impression of the environment to be constant over time. Instead, it is also possible to consider environments that change over time. This can occur, for example, through the storage of instantaneous recordings of the environments in different storage matrices and switching of the recordings, with time control, between the different storage matrices.

As described above, the body or surface intended to be shown on the screen is simulated in the computer as a grid model. The surface therefore comprises numerous polygon surfaces whose spatial position is defined by the spatial coordinates of the node points of the grid model. In an advantageous embodiment of the invention, triangles are used as polygon surfaces. This means that three points are connected by edges in the grid model. The use of triangles for modeling the surfaces has the advantage that the surface normal of a triangle is unambiguously defined by the spatial coordinates of the corner points, because three points always lie in one plane, while in polygons having more than three corner points, it is possible that the corner points do not lie exactly in one plane, so the surface normal is not defined exactly.

Figure 2A:
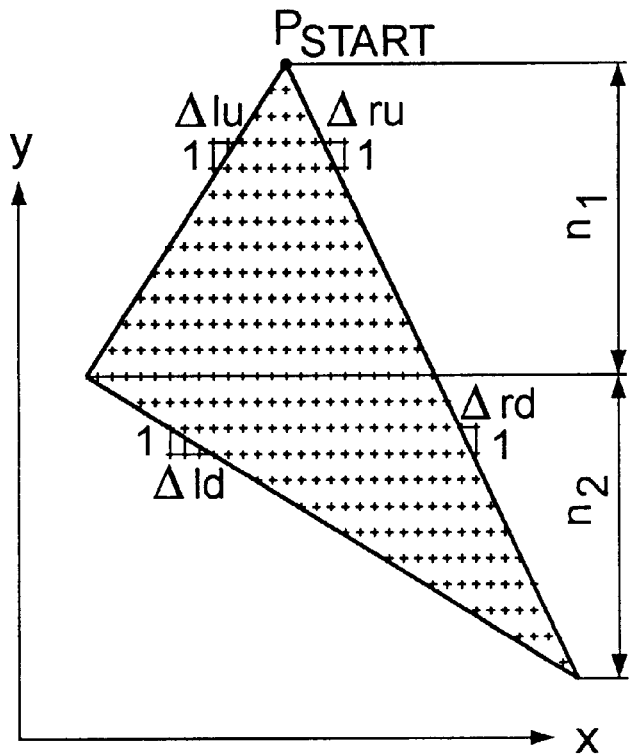
Figure 2B:
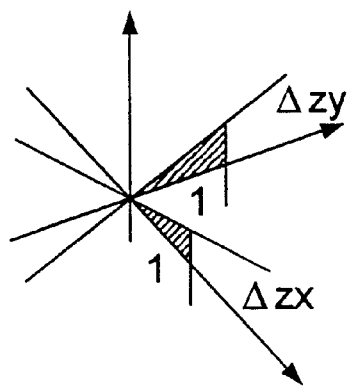
Figure 3:
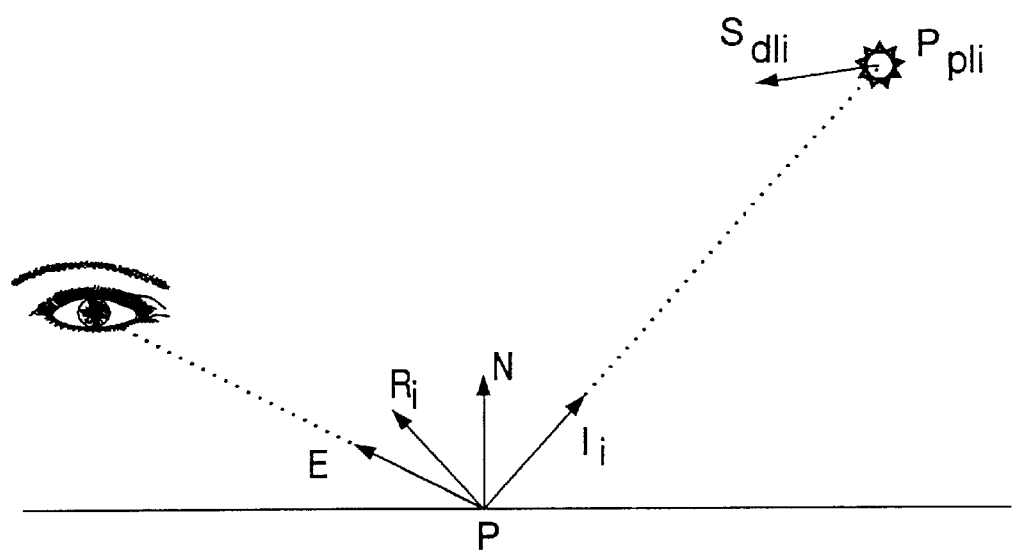
Figure 4A:
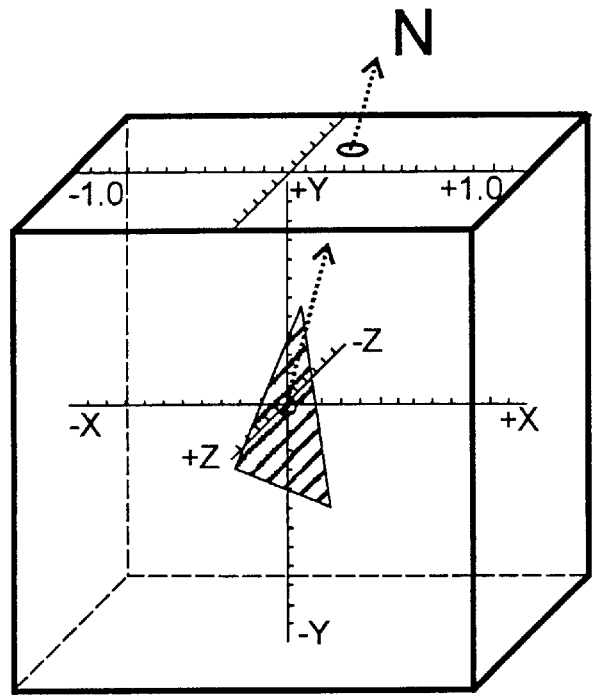
Figure 4B:
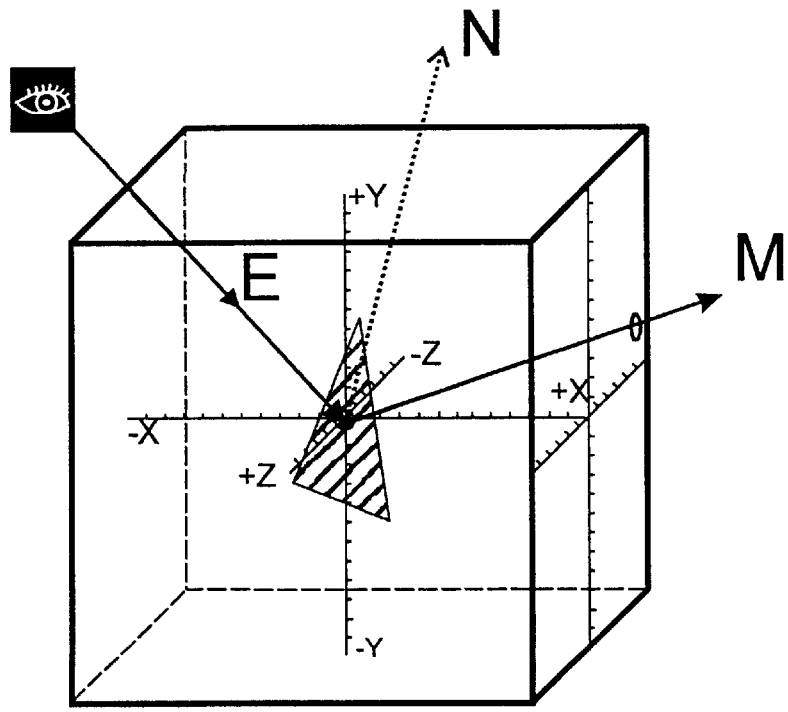

Other advantageous modifications of the invention are characterized in the dependent claims and described below in connection with the description of the preferred embodiment of the invention shown in the figures. Shown are in:

FIG. 1 as a preferred embodiment of the invention, a calculation unit for illustrating computer-modeled objects, the unit being a component of a comprehensive computer-graphics system, FIGS. 2a, 2b as an example, a polygon surface of a computer-modeled object for explaining the division of the polygon surface into scanlines and pixels, FIG. 3 a schematic representation of the illumination situation of a pixel for explaining the local illumination model, and FIGS. 4a, 4b a cubic envelope surface around a pixel for explaining the calculation of environmental reflections in diffuse and specular reflection, respectively.

FIG. 1 shows a calculation unit 1, which permits a representation of computer-modeled objects and is a component of a comprehensive computer-graphics system, of which only a system bus 2 is shown. The individual objects are stored as grid models in the graphics system, and are defined by the spatial coordinates of the node points of the grid model and the optical properties of the triangular polygon surfaces lying between the node points—for example, the color and the reflection properties.

The illustrated calculation unit 1 consecutively calculates the image impressions of all of the polygon surfaces of the individual objects, with the spatial position of the respective polygon surface, the desired perspective and the illumination situation being predetermined by the graphics system via the system bus 2. From the graphics system, the calculation unit 1 obtains a parameter set, via the system bus 2, for each polygon surface to be shown, the set representing the spatial position and the optical properties of the respective polygon surface, and the unit permits a fine division of the polygon surface into a plurality of pixels that are respectively disposed in scanlines. Thus, the parameter set includes the spatial coordinates $(x_s, y_s, z_s)$ of a corner point $p_{Start}$ of the triangle, the edge increments $\Delta lu$, $\Delta ru$, $\Delta ld$, $\Delta rd$, the number of scanlines $n_l$, $n_2$ of the triangle, and the inclination $\Delta zx$ of the triangle surface with respect to the X axis and the inclination $\Delta zy$ of the triangle surface with respect to the Y axis. The parameter set further includes the coordinates of the local surface normal $N_{Start}$ in the predetermined corner point and the vector increments $\Delta N_x$, $\Delta N_y$, which permit a calculation of the local surface normal in each pixel of the triangle surface. The triangle surface is therefore not necessarily planar, but is usually curved. On the one hand, this permits an adaptation of the curve to a predetermined surface course of the objects. On the other hand, in this way it is possible to attain a smooth and therefore visually inconspicuous transition at the edges between adjacent triangle surfaces. The parameter set also includes information about the color of the triangle surface, the absorption behavior, the transparency of the triangle surface and the like.

In the calculation unit 1, the parameter set produced by the superordinate graphics system is supplied to, among other components, a pipeline 3 (scanline initializer), which first divides the triangle surface into a plurality of scanlines and calculates the spatial coordinates of the initial point $(x_l, y_l, z_l)$ and the end point $(x_r, y_r, z_r)$ for each scanline. FIGS. 2a and 2b show this type of triangle surface for explaining the division into pixels. The individual scanlines are disposed parallel to the X axis and equidistantly from one another, so the Y coordinate of all pixels of a scanline is the result of the Y coordinate $y_s$ of the predetermined corner point $P_{Start}$, and the number i of the scanline. Thus, the following applies for the Y coordinates of the initial point and the end point of the individual scanlines:

$$y_l = y_s + i \quad y_r = y_s + i.$$

The X coordinate $x_l$ of the initial point of each scanline correspondingly results from the X coordinate $X_s$ of the predetermined starting point $P_{Start}$ the number i of the scanline and the edge increment $\Delta lu$ or $\Delta ld$. The edge increment $\Delta lu$ and, subsequently, the edge increment $\Delta ld$ are used within the first $n_l$ scanlines.

$$x_l = x_s + \Delta lu \cdot i$$

for $i \leq n_l$ $$x_l = x_s + \Delta lu \cdot n_l + (i - n_l) \cdot \Delta ld$$

for $n_l < i \leq n_l + n_2$

In the same way, the X coordinate $x_r$ of the end point of each scanline results from the X coordinate $x_s$ of the starting point $P_{Start}$, the number i of the scanline and the edge increment $\Delta ru$ or $\Delta rd$. The edge increment $\Delta ru$ is used during the first $n_l$ scanlines and, subsequently, the edge increment $\Delta rd$ is used:

$$x_r = x_s + \Delta lu \cdot i$$

for $i \leq n_l$ $$x_r = x_s + \Delta lu \cdot n_l + (i - n_l) \cdot \Delta rd$$

for $n_l < i \leq n_l + n_2$.

The Z coordinate $z_s$ of the initial point of each scanline results from the Z coordinate $z_s$ of the starting point $P_{Start}$, the number i of the scanline and the predetermined inclinations of the triangle surface with respect to the X axis and the Y axis:

$$z_l = z_s - i \cdot \Delta zy + (x_l - x_s) \cdot \Delta zx.$$

The pipeline 3 then transmits the predetermined inclination value $\Delta zy$ of the triangle surface and the coordinates of the initial point $(x_l, y_l, z_l)$ and the end point $(x_r, y_r, z_r)$ for each scanline to a downstream pipeline 4 (PCC—Pixel Coordinate Calculator), which divides the individual scanlines into a plurality of pixels and calculates their coordinates. Because the scanlines extend parallel to the X axis, the Y coordinate of each pixel is identical to the Y coordinate of the associated scanline:

$$yj = y_l.$$

The X coordinate of each pixel results from the X coordinate $x_l$ of the initial point of the scanline and the number j of the pixel in the scanline:

$$x_j = x_l + j.$$

The Z coordinate of a pixel can be calculated simply from the Z coordinate $z_l$ of the initial point of the associated scanline, the number j of the pixel within the scanline and the inclination $\Delta zx$ of the triangle surface relative to the X axis:

$$z_j = z_l + j \cdot \Delta zy.$$

The pipeline 4 thus calculates the coordinates for each pixel of the polygon surface, which is a prerequisite for a later calculation of the image impression corresponding to a local illumination model.

The parameter set produced by the superordinate graphics system and representing the spatial position of a respective triangle is further supplied to a pipeline 5 (normal vector initializer), which calculates the components ($xn_I$, $yn_I$, $zn_I$) of the normal vector $N_I$ at the initial point of each scanline. For this purpose, the received parameter set includes the components ($xn_s$, $yn_s$, $zn_s$) of the normal vector $N_s$ at the predetermined corner point $P_{Start}$ and the vector increments $\Delta N_x = (\Delta xn_x, \Delta yn_x, \Delta zn_x)$ and $\Delta N_y = (\Delta xn_y, \Delta yn_y, \Delta zn_y)$. The vector increment $\Delta N_y$ determines the change in the normal vector in the transition to the respectively next scanline, while the vector increment $\Delta N_x$ represents the change in the normal vector between two pixels of a scanline.

The normal vector at the initial point of a scanline is calculated from the predetermined normal vector $N_{Start}$ at the predetermined corner point $P_{Start}$ of the triangle, the X coordinate $x_I$ of the initial point of the scanline and the vector increments $\Delta N_x$, $\Delta N_y$ and the number i of the scanline:

$$N_{Ii} = N_{Start} + i\Delta N_y + (x_I - x_{Start})\Delta N_x$$

or written in terms of components:

$$xn_I = xn_s + i\Delta xn_y - (x_{Start})\Delta xn_x$$

$$yn_I = yn_s + i\Delta yn_y - (x_{Start})\Delta xn_x$$

$$zn_I = zn_s + i\Delta zn_y - (x_{Start})\Delta zn_x$$

The pipeline 5 then transmits the components of the normal vector at the initial point of the scanline, as well as the vector increment $\Delta N_x$, for each scanline to a downstream pipeline 6 (NVC—Normal Vector Calculator), which calculates the local surface normal for each pixel within the current scanline, the normal resulting from the normal vector $N_{Ii}$ at the initial point of the scanline, the number j of the pixel within the scanline and the vector increment $\Delta N_x$ according to the formula $$N = N_{Ii} + j\Delta N_x$$

or, written in terms of components, $$xn_I = xn_{Ii} + j\Delta xn_x$$

$$yn_I = yn_{Ii} + j\Delta yn_x$$

$$zn_I = zn_{Ii} + j\Delta zn_x$$

The coordinates of a scanline that have been calculated by the pipeline 4 and the components of the normal vector determined by the pipeline 6 at the location of the respective pixel are then supplied to a further pipeline 7, which calculates the image impression of the respective pixel corresponding to a local illumination model. In addition to the information about the spatial position and the orientation of the respective pixel, the pipeline 7 also requires information about the illumination situation and the desired perspective. The superordinate graphics system supplies, via the system bus, a parameter set ex, ey, ez, which determines the position of a virtual viewer and thus the perspective. Moreover, for each light source, the pipeline 7 obtains a parameter set that represents the position 1x, 1y, 1z, the primary beam direction and the intensity of the light source.

The image impression of the respective pixel is calculated separately for the three primary colors red, green and blue of the RGB color model, corresponding to Phong's illumination model shown schematically in FIG. 3, which uses the formula:

$$c = e_{cm} + a_{cm} \cdot a_{cs} + \sum_{i=0}^{n-1}(att_i)(spot_i)\left[a_{cm} \cdot a_{cli} + \left(\frac{p}{n} \cdot \frac{p}{l_i}\right)d_{cm} \cdot d_{cli} + \left(\frac{p}{r_i} \cdot \frac{p}{e}\right)^{s_{rm}} s_{cm} \cdot s_{cli}\right]$$

with $att_i = \dfrac{1}{k_{0i} + k_{1i}\left\|\dfrac{p}{l_i}\right\| + k_{2i}\left\|\dfrac{p}{l_i}\right\|^2}$ (distance attenuation)

pixel within the cutoff angle $$spot_i = \begin{cases} -\left(l_i \cdot \dfrac{p}{s_{dli}}\right)^{s_{rli}} \\ 0 \end{cases}$$

$c_{rli}$
otherwise
(spotlight attenuation)

| | |
|---|---|
| $a_{cm}$, $d_{cm}$, $s_{cm}$ | ambient, diffuse and specular color, respectively, of the material |
| $e_{cm}$ | emissive color of the material |
| $s_{cm}$ | specular exponent of the material |
| $a_{cli}$, $d_{cli}$, $s_{cli}$ | ambient, diffuse and specular color, respectively, of the light source i |
| $P_{pli}$ | position of the light source i |
| $s_{dli}$ | primary beam direction of the light source i |
| $s_{rli}$ | spotlight exponent of the light source i |
| $c_{rli}$ | spotlight cutoff angle of the light source i |
| $k_{0i}$, $k_{1i}$, $k_{2i}$ | constant, linear and quadratic distance attenuation, respectively, of the light source i |
| $a_{cs}$ | ambient color of the scene |

The above-described calculation of the image impression of the individual pixels according to Phong's illumination model advantageously permits a quasi-continuous shading of the individual polygon surfaces without disturbing jumps in intensity, but does not take into consideration any interactions of the individual pixels among themselves or with the environment.

The illustrated calculation unit 1 therefore additionally calculates the reflections of the environment at the respective object surface; diffuse reflection and specular reflection can be considered independently of one another. For this purpose, the calculation unit 1 includes two storage elements 8, 9 that have a plurality of storage locations, with each storage location of the storage elements 8, 9 containing image information representing the image impression of the environment from a certain perspective. As shown in FIGS. 4a and 4b, the storage elements 8, 9 each simulate cubic envelope surfaces that encompass the respective pixel, with each storage location of the storage element 8, 9 being associated with a surface element of the envelope surface and defining the image impression of the environment in the respective direction. The cubic envelope surfaces are thus quasi-all-around recordings of the environment from the perspective of the individual pixels.

Each storage element 8, 9 simulates a plurality of cubic envelope surfaces for taking into account different environment reflections within the spatial scene as a function of position. The different environments are defined in different storage areas in the two storage elements 8, 9.

The storage areas are selected by an addressing unit 10, 11, which is connected on the input side to the pipeline 4 for receiving the parameter set that represents the spatial position of the respective pixel. The addressing units 10, 11 then determine, as a function of the position of the pixel, which environment is to be considered, and select the associated storage area in the storage elements 8, 9.

Furthermore, the addressing units 10, 11 have the task of addressing those storage locations inside the storage areas selected as a function of position that represent the image impression of the environment reflected at the object.

In diffuse reflection, this addressing is effected solely as a function of the local surface normal, because the position of the viewer is of no consequence. The addressing unit 11 is therefore connected on the input side to the pipeline 6 for receiving the second coordinate set representing the spatial position of the local surface normal, and—as shown in FIG. 4a—determines the point where the local surface normal N intersects the cubic envelope surface.

In contrast, in specular reflection of the environment at the respective pixel, addressing is effected as a function of the position of the virtual viewer, on the one hand, and the spatial position of the local surface normal, on the other hand. Therefore, as shown in FIG. 4b, the addressing unit 10 first uses the positon of the viewer and the position of the respective pixel to calculate the eye vector E, that is, the connecting line between the virtual viewer and the pixel. Subsequently, the reflected eye vector M is calculated from the eye vector E and the local surface normal N, and the point where the reflected eye vector M intersects the cubic envelope surface is determined. Then the addressing unit 10 addresses the associated storage location of the storage element 8 and reads out the associated image-information value.

The calculation unit 1 calculates the image-information values of the individual pixels corresponding to Phong's illumination model, on the one hand, and determines the image impression resulting from diffuse and specular reflection of the environment at the respective pixel, on the other hand. The resulting three image-information values are then supplied to a further calculation unit 12, which calculates the final image-information value corresponding to predetermined weighting factors.

To display an image on a screen 13, it is also necessary to convert the three-dimensional coordinates of the individual pixels into a two-dimensional screen-coordinate system that indicates the position of the respective pixel on the screen. The coordinates calculated by the pipeline 4 are therefore supplied to a pipeline 14, also called a Z filter, which calculates the screen coordinates for each pixel.

The screen-coordinate set serves in addressing a screen memory 15, which receives the image-information values of the individual pixels from the pipeline 7.

Following the calculation of all of the pixels of all polygon surfaces, the screen memory 15 contains a view in perspective of the virtual spatial scene. This image is then reproduced by a screen drive circuit 16 connected on the input side to the screen memory 15, and the screen 13.

The invention is not limited in its embodiment to the above-described, preferred embodiments. Rather, numerous variations are conceivable that make use of the illustrated solution, even in fundamentally different embodiments.

We claim:

1. An imaging method for displaying computer-modeled objects that are present in the form of a grid model and are simulated by a plurality of adjacent polygon surfaces, in which a first pipeline (3, 4) calculates a plurality of first coordinate sets from a predetermined, first parameter set that respectively represents the spatial position of one of the polygon surfaces, the coordinate sets respectively representing the spatial position of a pixel of the respective polygon surface, a second pipeline (5, 6) uses the first parameter set representing the spatial position of the polygon surface to calculate a second coordinate set for each pixel of the polygon surface, which set represents the spatial position of the local surface normal (N), a third pipeline (7) uses the first coordinate sets representing the spatial position of the individual pixels, and the second coordinate sets representing the spatial position of the local surface normal (N), as well as a predetermined, second parameter set that represents the spatial position and the optical properties of at least one first light source, and a predetermined, third parameter set that represents the position of a virtual viewer to calculate a first image-information value corresponding to a local illumination model, which value represents an image impression of the respective pixel from the perspective of the viewer, a fourth pipeline (14) uses the first coordinate set representing the spatial position of the respective pixel to calculate a two-dimensional screen-coordinate set for each pixel for display on a screen (13), which set determines the position of the pixel on the screen (13), characterized in that a first calculation unit (10, 11) calculates a first addressing value for the individual pixels using the second coordinate sets representing the spatial position of the local surface normal (N) and/or the third parameter set representing the position of the virtual viewer, and the first coordinate set representing the spatial position of the pixel, the first addressing value is used to address a storage location of a first storage matrix (8, 9), and a second image-information value representing the image impression of the environment from a certain perspective is read out of the addressed storage location, and a third image-information value is calculated from the first and second image-information values for actuating the screen (13) in order to take into consideration both the local illumination model and reflections of the environment by means of a second calculation unit (12).

2. The imaging method according to claim 1, characterized in that an eye vector (E) is calculated from the third parameter set representing the position of the viewer and the first coordinate set representing the spatial position of the pixel, which vector lies in the connecting line between the viewer and the pixel, the eye vector (M) that is reflected at the pixel in an ideal mirror reflection is calculated from the eye vector (E) and the second coordinate set representing the spatial position of the local surface normal (N), and that the first addressing value is calculated from the reflected eye vector (M), and represents the point of intersection of the reflected eye vector (M) and a cubic envelope surface that encompasses the pixel or the polygon surface, wherein the first storage matrix (8) represents the image impression of the environment that is to be considered within the scope of mirror reflection.

3. The imaging method according to claim 1, characterized in that a third calculation unit (11) uses the second coordinate set representing the spatial position of the local surface normal (N) to calculate a second addressing value, which represents the point of intersection of the local surface normal (N) and a cubic envelope surface encompassing the pixel or the polygon surface, the second addressing value is used to address a storage location of a second storage matrix (9), and a fourth image-information value is read out of the addressed storage location, which value represents an image impression of the environment that is to be considered within the scope of diffuse reflection, the second calculation unit (12) calculates the third image-information value serving to actuate the screen (13) from the first image-information value that has been determined corresponding to the local illumination model, and the second image-information value representing specular environment reflections, as well as from the fourth image-information value representing diffuse environment reflections.

4. The imaging method according to claim 1, characterized in that the first addressing value and/or the second addressing value is or are calculated as a function of the first parameter set representing the spatial position of the polygon surface, or the first coordinate set representing the spatial position of the pixel, for position-dependent addressing of different storage areas of the first storage matrix (8) and/or the second storage matrix (9), each area defining different environments.

5. The imaging method according to claim 1, characterized in that a selection value is calculated as a function of the first parameter set representing the spatial position of the polygon surface, or the first coordinate set representing the spatial position of the pixel, for position-dependent display of different environments, and the first storage matrix (8) and/or the second storage matrix (9) is or are selected, as a function of the selection value, from a plurality of storage matrices that define different environment impressions.

6. The imaging method according to claim 1, characterized in that the first storage matrix (8) and/or the second storage matrix (9) define(s) a partial region of the environment to be represented, wherein a storage location of the first storage matrix (8) and/or a storage location of the second storage matrix (9) is or are unambiguously associated with each spatial-angle region of the environment to be represented, and the first and/or the second addressing value is or are calculated under the assumption that the predetermined partial region repeats on the cubic envelope surface.

7. The imaging method according to claim 6, characterized in that the second image-information values stored in the first storage matrix (8) and/or the fourth image-information values of a predetermined image pattern that are stored in the second storage matrix (9) are read in and, to attain a natural image impression, are subsequently changed by an image-processing unit such that no jumps in intensity or color occur between adjacent partial regions along the impact edge, and/or the change in intensity or color values is constant over the impact edge.

8. The imaging method according to claim 1, characterized in that a third addressing value, which represents the position of the pixel within the polygon surface, is calculated from the first coordinate set representing the spatial position of the pixel and the first parameter set representing the spatial position of the polygon surface, the third addressing value is used to address a storage location of a third storage matrix, and a fifth image-information value that defines the texture of the polygon surface is read out of the addressed storage location, and the second calculation unit (12) calculates the third image-information value serving to actuate the screen (13) as a function of the fifth image-information value.

9. An apparatus for displaying computer-modeled objects that are present in the form of a grid model and are simulated by a plurality of adjacent polygon surfaces, particularly for executing the imaging method according to one of the foregoing claims, having a first pipeline (3, 4) for using a predetermined, first parameter set that represents the polygon surface to calculate a plurality of first coordinate sets that represent the spatial position of a pixel of the respective polygon surface, a second pipeline (5, 6) for calculating the second coordinate sets representing the spatial position of the local surface normals (N) in the individual pixels as a function of the first parameter set, a third pipeline (7) for calculating a first image-information value that respectively represents a pixel, corresponding to a local illumination model, as a function of the first coordinate set representing the spatial position of the pixel and the second coordinate set representing the spatial position of the local surface normal (N), and a predetermined, second parameter set that determines the spatial positon and the optical properties of at least one light source, as well as a predetermined, third parameter set that determines the position of a virtual viewer, and a fourth pipeline (14) for calculating a two-dimensional screen-coordinate set for each pixel from the first coordinate set representing the spatial position of the pixel, characterized in that a first storage matrix (8, 9) is provided for representing reflections of the environment in the surface of the object, wherein each storage location of the first storage matrix (8, 9) includes a second image-information value that represents the image impression of the environment from a certain perspective, a first calculation unit (10, 11), which is connected on the output side to the first storage matrix (8, 9) for addressing a storage location, is provided for calculating a first addressing value as a function of the second coordinate sets representing the spatial position of the local surface normal (N), and/or the third parameter set representing the position of the virtual viewer, and the first coordinate set representing the spatial position of the pixel, and a second calculation unit (12), which is connected on the input side to the third pipeline (7) for receiving the first image-information value corresponding to the local illumination model, and to the first storage matrix (8, 9) for receiving the second image-information value representing the reflections of the environment, is provided for calculating a third image-information value that takes into account both the local illumination model and reflections of the environment.

10. The apparatus according to claim 9, characterized in that a second storage matrix (9) is provided for representing diffuse environment reflections, wherein each storage location of the second storage matrix (9) contains a fourth image-information value, which contains the image impression of the environment that is to be considered in diffuse reflection, a third calculation unit (11) is provided for calculating a second addressing value, the unit being connected on the input side to the second pipeline (6) for receiving the second coordinate set representing the spatial position of the local surface normal (N), and on the output side to the second storage matrix (9) for addressing with the second addressing value, and the second calculation unit (12) is connected on the input side to the second storage matrix (9) for using the first image-information value determined corresponding to the local illumination model, and the second image-information value representing specular environment reflections, and the fourth image-information value representing diffuse environment reflections, to calculate the third image-information value serving to actuate the screen (13).

11. The apparatus according to claim 9, characterized in that a fourth calculation unit (10, 11) is provided for using the first parameter set representing the spatial position of the polygon surface, or the first coordinate set representing the spatial position of the pixel, to calculate a selection value that is dependent on the position of the polygon surface or pixel, the fourth calculation unit (10, 11) is connected to the first and/or the second storage matrix (8, 9) for position-dependent selection of a storage area, or to a selection unit (10, 11) for position-dependent selection of the first and/or second storage matrix (8, 9) from a plurality of storage matrices.

12. The apparatus according to claim 9, characterized in that the first storage matrix and/or the second storage matrix contains an all-around recording from the perspective of the respective pixel or polygon surface, and a spatial-angle region of the environment to be represented is unambiguously associated with each storage location of the first storage matrix and/or each storage location of the second storage matrix.

13. The apparatus according to claim 9, characterized in that the first storage matrix and/or the second storage matrix define(s) a partial region of the environment to be represented, wherein a storage location of the first storage matrix and/or the second storage matrix is unambiguously associated with each spatial-angle region of the environment to be represented, a first addressing unit, which is connected on the input side to the first and/or the second calculation unit(s) for receiving the first or second addressing value that determines the spatial-angle region of the environment to be represented, and on the output side to the first and/or second storage matrix, is provided for addressing the first storage matrix and/or the second storage matrix.

14. The apparatus according to claim 13, characterized in that the first storage matrix and/or the second storage matrix is or are connected to an image-processing unit, which changes the second image-information values stored in the first storage matrix, and/or the fourth image-information values stored in the second storage matrix, such that, to attain a natural image impression, no jumps in intensity or color occur between adjacent partial regions along the impact edge, and/or the change in intensity or color values is constant over the impact edge.

15. The apparatus according to claim 9, characterized in that a third storage matrix is provided for simulating a texture of the respective polygon surface, wherein a storage location of the third storage matrix is associated with each pixel of the polygon surface, and the individual storage locations of the third storage matrix respectively contain a fifth image-information value that defines the texture, a second addressing unit is provided for calculating a third addressing value that represents the spatial position of the respective pixel within the respective polygon surface, and for addressing the third storage matrix with the third addressing value, and the second calculation unit (12) is connected on the input side to the third storage matrix for calculating the third image-information value serving to actuate the screen (13) as a function of the fifth image-information value that defines the texture.

* * * * *